(12) United States Patent
Martin, III (10) Patent No.: US 9,074,677 B2
(45) Date of Patent: Jul. 7, 2015

(54) CARRIER ASSEMBLY WITH THREADED ADJUSTMENT MEMBER

(75) Inventor: Robert J. Martin, III, Newark, OH (US)

(73) Assignee: ArvinMeritor Technology, LLC, Troy, MI (US)

(*) Notice: Subject to any disclaimer, the term of this patent is extended or adjusted under 35 U.S.C. 154(b) by 319 days.

(21) Appl. No.: 13/046,943

(22) Filed: Mar. 14, 2011

(65) Prior Publication Data
US 2012/0238393 A1 Sep. 20, 2012

(51) Int. Cl.
*F16H 48/06* (2006.01)
*F16H 57/037* (2012.01)
*F16H 57/04* (2010.01)

(52) U.S. Cl.
CPC .......... *F16H 57/037* (2013.01); *F16H 57/0471* (2013.01); *F16H 57/0483* (2013.01); *Y10T 29/49464* (2015.01)

(58) Field of Classification Search
CPC .. F16C 2361/61; F16H 57/037; F16H 57/023
USPC ........ 74/424, 606 A, 606 R, 416, 417, 459.5; 384/583, 519, 252, 258, 585
See application file for complete search history.

(56) References Cited

U.S. PATENT DOCUMENTS

| | | | | |
|---|---|---|---|---|
| 2,588,670 A * | 3/1952 | Terry | ............................. | 475/246 |
| 3,792,625 A * | 2/1974 | Asberg | ............................. | 74/424 |
| 4,034,621 A * | 7/1977 | Ritter, Jr. | ......................... | 74/424 |
| 4,077,279 A * | 3/1978 | Goscenski, Jr. | ................ | 475/231 |
| 4,185,938 A * | 1/1980 | Pareja | ......................... | 403/359.5 |
| 4,637,276 A * | 1/1987 | Holan et al. | ................. | 74/665 T |
| 4,798,260 A * | 1/1989 | Nakata et al. | ................. | 180/253 |
| 5,070,745 A * | 12/1991 | Lindsey et al. | .......... | 74/665 GB |
| 5,257,962 A * | 11/1993 | Martin et al. | ................. | 475/200 |
| 5,269,731 A | 12/1993 | Scudder et al. | | |
| 5,404,963 A | 4/1995 | Crepas et al. | | |
| 5,624,345 A | 4/1997 | Graft et al. | | |
| 6,004,040 A * | 12/1999 | Rode | ............................. | 384/583 |
| 6,227,716 B1 * | 5/2001 | Irwin | ............................ | 384/583 |
| 6,293,704 B1 * | 9/2001 | Gradu | .......................... | 384/557 |
| 6,409,626 B1 * | 6/2002 | Irwin | .......................... | 475/230 |
| 6,478,709 B1 * | 11/2002 | Irwin et al. | .................... | 475/230 |
| 6,544,140 B2 * | 4/2003 | Gradu et al. | .................. | 475/246 |
| 6,736,544 B1 | 5/2004 | DeWald | | |
| 6,761,237 B2 * | 7/2004 | Brissette et al. | ........... | 180/24.12 |
| 6,766,708 B2 * | 7/2004 | Brooks | ......................... | 74/424 |
| 6,848,531 B2 * | 2/2005 | Izumi et al. | ................... | 180/344 |
| 6,957,918 B2 * | 10/2005 | Beutler et al. | ................ | 384/448 |
| 7,086,983 B2 * | 8/2006 | Turner et al. | .................. | 475/230 |
| 7,090,609 B2 * | 8/2006 | Ziech et al. | .................... | 475/220 |
| 7,108,428 B2 * | 9/2006 | Ason et al. | .................... | 384/583 |

(Continued)

*Primary Examiner* — Justin Krause
*Assistant Examiner* — Gregory Prather
(74) *Attorney, Agent, or Firm* — Brooks Kushman P.C.

(57) ABSTRACT

A carrier assembly includes an adjustment member with a threaded attachment surface that is threadably attached to a mating threaded surface of a housing. The threaded attachment surface is formed on the adjustment member between first and second pilot surfaces, which allows the adjustment member to be selectively rotated to adjust a position of the adjustment member relative to the housing to set a desired carrier characteristic without requiring shims or spacers. The adjustment member also includes a splined outer surface that engages a splined lock member to lock the adjustment member to the housing once the desired carrier characteristic has been set.

15 Claims, 4 Drawing Sheets

(56) References Cited

U.S. PATENT DOCUMENTS

| | | | |
|---|---|---|---|
| 7,140,268 B2 * | 11/2006 | Leposky et al. | 74/424 |
| 7,350,977 B2 * | 4/2008 | Fukuda et al. | 384/512 |
| 7,393,141 B2 * | 7/2008 | Fahrni et al. | 384/583 |
| 7,500,934 B2 * | 3/2009 | Ziech | 475/221 |
| 7,651,276 B2 * | 1/2010 | Nied et al. | 384/557 |
| 7,707,721 B2 * | 5/2010 | Leibold | 29/893.1 |
| 7,762,725 B2 * | 7/2010 | Fahrni et al. | 384/583 |
| 8,038,570 B2 * | 10/2011 | Loeber | 475/348 |
| 8,066,608 B2 * | 11/2011 | Sugiura et al. | 475/271 |
| 8,234,948 B2 * | 8/2012 | Kohigashi et al. | 74/424 |
| 8,616,780 B2 * | 12/2013 | Kwasniewski et al. | 384/583 |
| 2001/0045139 A1 * | 11/2001 | Fullerton | 74/424 |
| 2003/0108262 A1 * | 6/2003 | Bell | 384/585 |
| 2005/0247148 A1 * | 11/2005 | Slesinski et al. | 74/424 |
| 2006/0219037 A1 * | 10/2006 | Inose et al. | 74/424 |
| 2007/0062320 A1 * | 3/2007 | Tomizawa | 74/424 |
| 2008/0163712 A1 * | 7/2008 | Oberle et al. | 74/424 |
| 2009/0084211 A1 * | 4/2009 | Aoyama et al. | 74/424 |
| 2012/0295753 A1 * | 11/2012 | Kwon | 475/246 |

* cited by examiner

CARRIER ASSEMBLY WITH THREADED ADJUSTMENT MEMBER

TECHNICAL FIELD

This invention generally relates to a carrier assembly with a threaded adjustment member that is infinitely adjustable to provide a desired carrier setting.

BACKGROUND OF THE INVENTION

A carrier includes a pinion gear that is in meshing engagement with a ring gear. The pinion gear is driven by a driveshaft member that receives driving input from a vehicle power source such as an engine or electric motor, for example. The pinion gear is rotatably supported by pinion bearings within a pinion cage that is mounted to a carrier shell. The ring gear is mounted to a differential which provides driving output to a pair of output shafts. The differential includes a differential case comprised of flange and plain case halves that are secured together to enclose a differential gear assembly. Differential bearings support the flange and plain case halves. Side gears are in meshing engagement with the differential gears. The side gears are coupled to the output shafts.

In one known configuration, an adjusting ring is positioned near the flange case half and is used to house the flange side differential bearing and roller bearing for the associated output shaft. The adjusting ring includes a threaded portion that is adjustable to set a desired differential bearing preload. The differential bearings are preloaded to specified levels to ensure acceptable wear levels and operating life.

It is also important to provide good contact between pinion gear teeth and ring gear teeth to ensure acceptable wear levels and operating life. Traditionally, gear contact for the pinion gear is set by installing shims between the pinion cage and the carrier shell, or by placing spacers behind an inner pinion bearing cup. Both of these adjustment methods require an initial "best estimate" by an installer. If this initial best estimate does not provide an acceptable contact pattern, the installer must then disassemble the components, select different shims or spacers, and re-assemble the components. This assembly/dis-assembly method continues until the gear contact pattern is acceptable. Thus, this process is time consuming and labor intensive.

SUMMARY OF THE INVENTION

A carrier assembly includes an adjustment member with a threaded attachment surface that is threadably attached to a mating threaded surface of a housing. The threaded attachment surface is formed on the adjustment member between first and second pilot surfaces, which allows the adjustment member to be selectively rotated to adjust a position of the adjustment member relative to the housing to set a desired carrier characteristic without requiring shims or spacers.

In one example, the adjustment member also includes a splined outer surface that engages a splined lock member to lock the adjustment member to the housing once the desired carrier characteristic has been set.

In one example, the housing comprises a differential case and the desired carrier characteristic comprises a differential bearing preload. An output shaft bearing is supported within the adjustment member and a differential bearing engages an inner surface of the differential case. An end face of the adjustment member directly abuts against the differential bearing such that the adjustment member is rotatable via the threaded attachment surface to adjust the differential bearing preload.

In another example, the housing comprises a carrier shell and the adjustment member comprises a pinion cage that is attached to the carrier shell. A ring gear is positioned within the carrier shell and includes a plurality of ring gear teeth. A pinion gear has an inner end and an outer end, with the inner end including a plurality of pinion gear teeth that are in meshing engagement with the plurality of ring gear teeth. A first pinion gear bearing is positioned adjacent the inner end and a second pinion gear bearing is axially spaced from the first pinion gear bearing in a direction toward the outer end. The first and second pinion gear bearings rotatably support the pinion gear for rotation relative to the pinion cage. The first and second pilot surfaces are formed on an outer peripheral surface of the adjustment member on opposite sides of the threaded attachment surface. The pinion cage is rotated relative to the carrier shell via the threaded attachment surface to adjust a gear contact pattern between the pinion gear and the ring gear. Once a desired contact pattern is achieved, the splined lock member is locked into place.

These and other features of the present invention can be best understood from the following specification and drawings, the following of which is a brief description.

DETAILED DESCRIPTION OF THE PREFERRED EMBODIMENT

Figure 1:
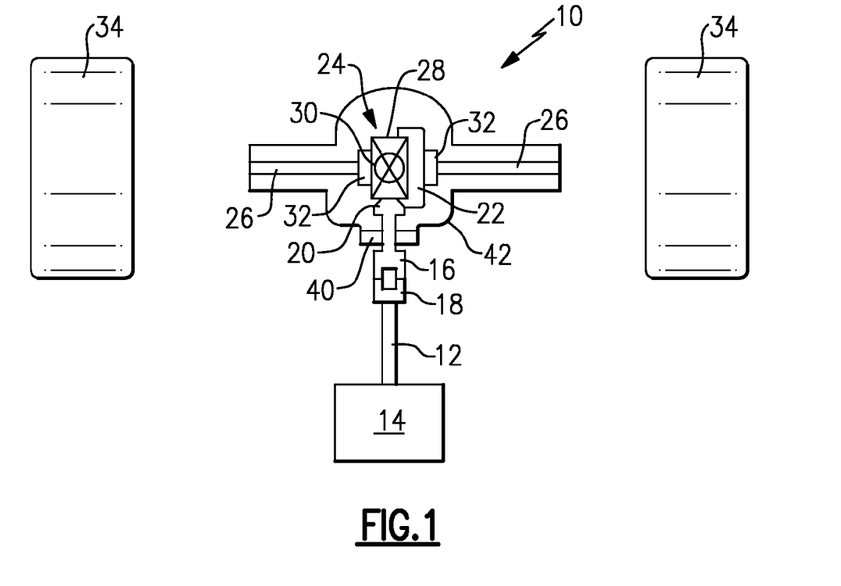
FIG. 1 is a schematic view of a carrier assembly.

A schematic view of a carrier assembly 10 is shown in FIG. 1. The carrier assembly 10 is coupled to a driveshaft 12 that receives driving input from a vehicle power source 14, such as an electric motor or engine, for example. As known, various combinations of additional components such as transmissions, auxiliary gear boxes, transfer cases, etc. (not shown) can be positioned along the driveline between the power source 14 and the carrier assembly 10. The carrier assembly 10 includes an input yoke 16 that is coupled to a mating yoke 18 supported on the input driveshaft 12.

The input yoke 16 is coupled to a pinion gear 20 that is in meshing engagement with a ring gear 22. The ring gear 22 provides driving input to a differential 24 that provides driving output to a pair of output shafts 26. The differential 24 includes a differential housing or case 28 that is fixed to the ring gear 22, and further includes a plurality of differential gears 30. As known, there are four differential gears supported on a cross-shaped differential spider which are in meshing engagement with side gears 32 that are fixed for rotation with the output shafts 26. The differential 24 operates to allow the output shafts 26 to turn at different speeds, which is required, for example, when the vehicle is executing a turning maneuver. The operation of the differential 24 is well known and will not be discussed in further detail.

The carrier assembly 10 is used to provide driving output (via output shafts 26) to vehicle wheels 34. The carrier assembly can be part of an independent suspension configuration where the output shafts 26 are coupled to wheel input shafts (not shown). Optionally, the carrier assembly can be incorporated into a rigid axle configuration with the carrier assembly being mounted within an axle housing that extends between wheel ends (not shown).

The carrier assembly 10 includes a threaded adjustment member that is threadably attached to a mating threaded surface of a housing. The threaded adjustment member is selectively rotated to adjust a position of the adjustment member relative to the housing to set a desired carrier characteristic without requiring shims or spacers.

Figure 2:
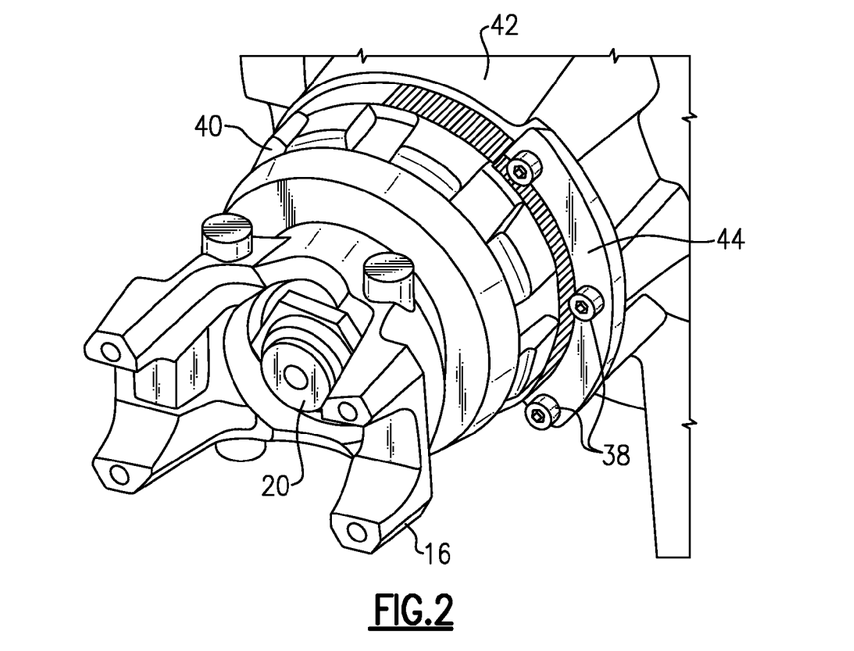
FIG. 2 is a perspective view of an input portion of a carrier assembly with a pinion cage incorporating the subject invention.
Figure 3A:
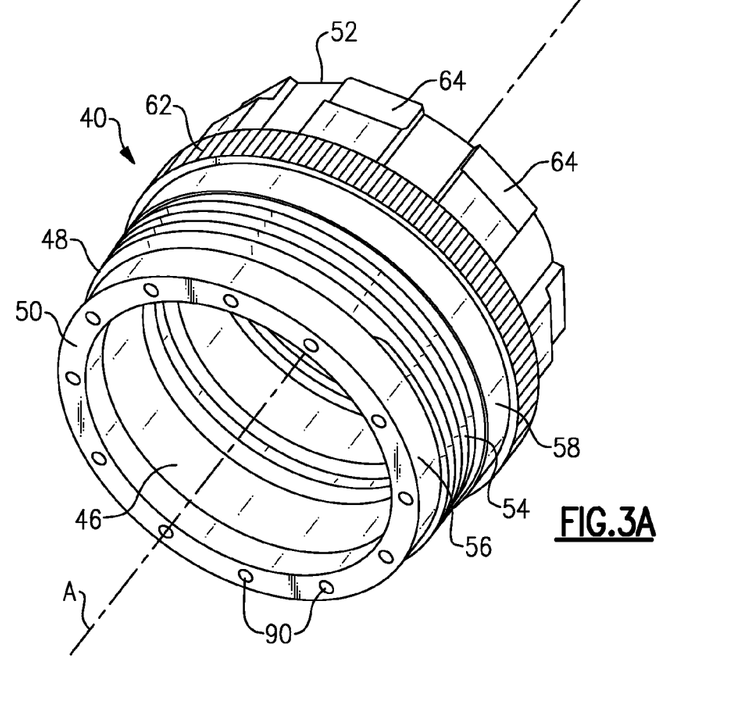
FIG. 3A is a perspective view of the pinion cage of FIG. 2.
Figure 3B:
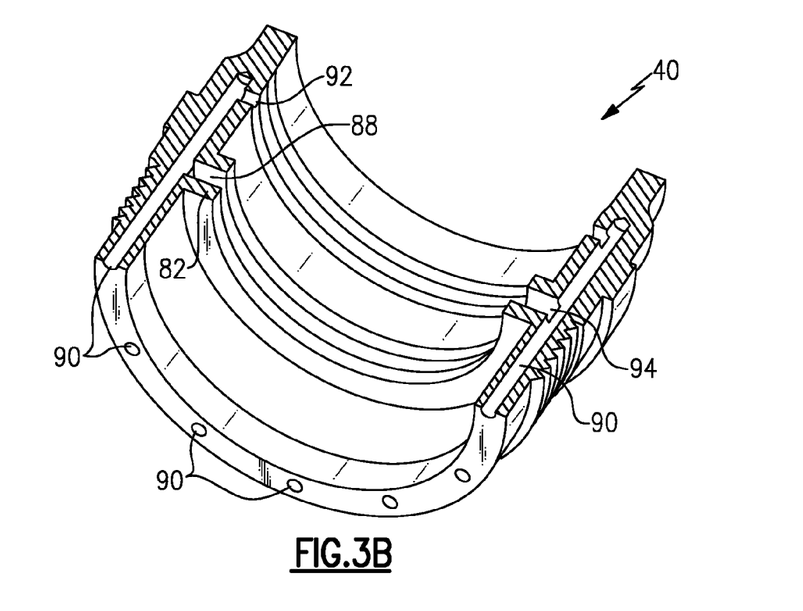
FIG. 3B is a cross-sectional view of the pinion cage of FIG. 3A.
Figure 4:
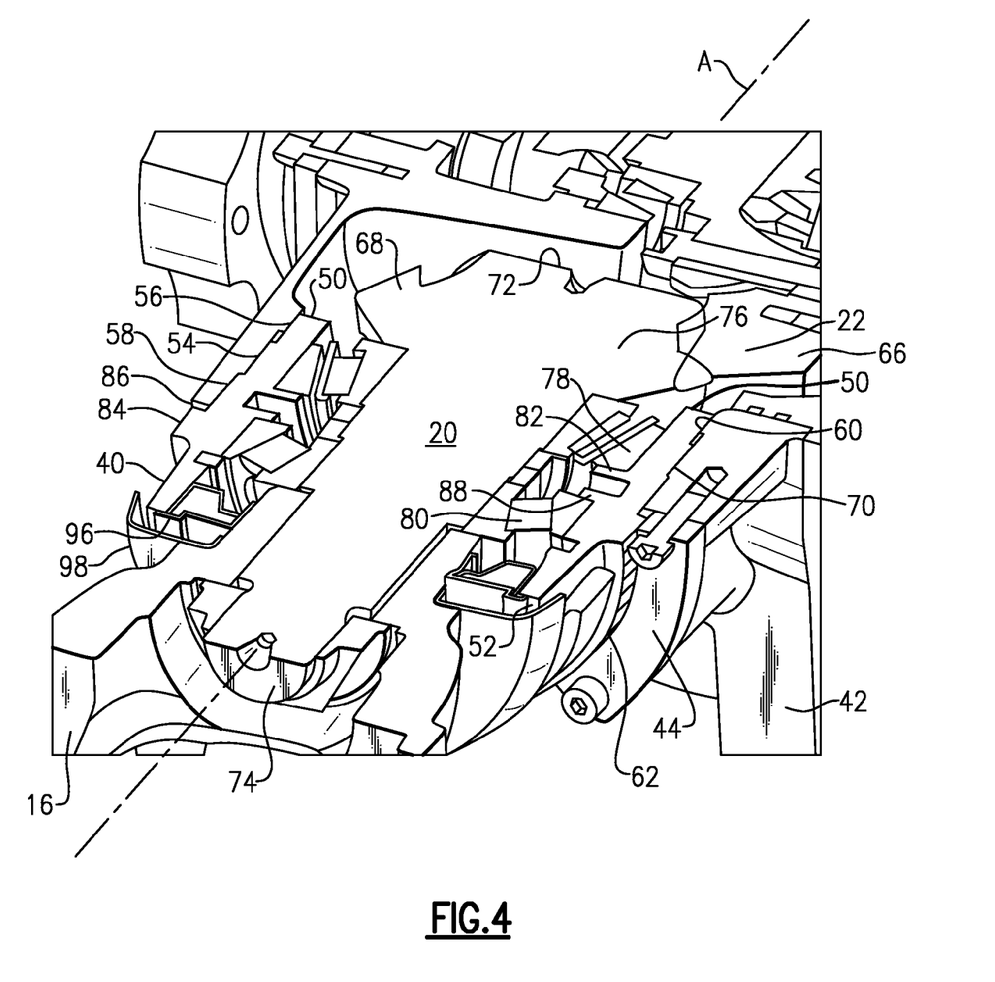
FIG. 4 is a cross-sectional view of the input portion of the carrier assembly and pinion cage of FIG. 2.

One example of such a threaded adjustment member is found in FIGS. 2-4. In this example, the threaded adjustment member comprises a pinion cage 40 that is attached to a carrier shell 42. A splined lock member 44 is fastened to the shell 42 with fasteners 38 and serves to lock the pinion cage 40 in place once a final adjustment operation has been performed. This will be discussed in greater detail below.

As shown in FIGS. 3A-3B, the pinion cage 40 comprises a cylindrically shaped body having an inner circumferential surface 46 and an outer circumferential surface 48. The pinion cage 40 extends along an axis A from an inner end 50 to an outer end 52. The outer circumferential surface 48 has a threaded attachment surface 54 that is threadably attached to the carrier shell 42. A first pilot surface 56 is positioned on one side of the threaded attachment surface 54 and a second pilot surface 58 is positioned on an opposite side of the threaded attachment surface 54. The first 56 and second 58 pilot surfaces directly face an inner surface 60 of the carrier shell 42 (FIG. 4) in a close fit configuration. The pinion cage 40 is selectively adjustable via the threaded attachment surface 54 to provide a desired gear contact pattern between the pinion gear 20 and the ring gear 22.

A splined surface 62 is formed within the outer circumferential surface 48 of the pinion cage 40. The splined surface 62 is axially spaced from the threaded attachment surface 54 in a direction toward the outer end 52. The splined surface 62 mates with the splined lock member 44 once the desired gear contact pattern is achieved to lock the pinion cage 40 to the carrier shell 42.

A tool gripping surface 64 is also formed within the outer circumferential surface 48 of the pinion cage. The tool gripping surface 64 is axially spaced from the splined surface 62 in a direction toward the outer end 52. A tool (not shown) grips the pinion cage 40 at this gripping surface 64 to rotatably adjust the position of the pinion cage 40 relative to the carrier shell 42. The tool gripping surface 64 could comprise a plurality of wrench flats, for example.

The pinion cage 40 is installed within the carrier shell 42 as shown in FIG. 4. The pinion gear 20 and the ring gear 22 are positioned within the carrier shell 42 such that a plurality of ring gear teeth 66 are in direct meshing engagement with a plurality of pinion gear teeth 68. The first pilot surface 56 comprises an inner pilot surface that directly faces a first inner surface portion of the inner surface 60 of the carrier shell 42 in a close fit arrangement. The second pilot surface 58 comprises an outer pilot surface that directly faces a second inner surface portion of the inner surface 60 of the carrier shell 42 in a close fit arrangement. The second inner surface portion of the carrier shell 42 is axially spaced from the first inner surface portion, and the threaded attachment surface 54 of the pinion cage 40 engages a mating threaded surface 70 on the inner surface 60 of the carrier shell 42, which is positioned axially between the first and the second inner surface portions. The pinion cage 40 is selectively adjustable via this threaded attachment to provide the desired gear contact pattern between the pinion gear 20 and the ring gear 22.

The pinion gear 20 includes an inner end 72 and an outer end 74. The inner end 72 includes an enlarged gear head portion 76 that forms the plurality of pinion gear teeth 68, and the outer end 74 comprises a shaft portion of reduced diameter compared to the head portion 76. A first (inner) pinion gear bearing 78 is positioned adjacent the enlarged gear head portion 76 of the inner end 72 of the pinion gear 20, and a second (outer) pinion gear bearing 80 is axially spaced from the first pinion gear bearing 78 in a direction toward the outer end 74. The first 78 and second 80 pinion gear bearings rotatably support the pinion gear 20 for rotation relative to the pinion cage 40.

The pinion cage 40 includes an inner flange 82 that directly abuts against the first pinion gear bearing 78 and an outer flange 84 that directly faces an end face 86 of the carrier shell 42. Due to the combination of the threaded attachment surface 54 and the first 56 and second 58 pilot surfaces, the area between the inner flange 82 and the bearing 78 and the area between the outer flange 84 and the end face 86 are shimless/spacerless areas. In other words, no shims or spacers are required to set the desired gear contact pattern at these areas. The desired gear contact pattern is solely set by rotational adjustment of the pinion cage 40 within the carrier shell 42.

The inner flange 82 comprises a first inner flange 82 that directly abuts against the inner pinion gear bearing 78 such that the inner pinion gear bearing 78 is sandwiched directly between the first inner flange 82 and the enlarged gear head portion 76. A second inner flange 88 directly abuts against the outer pinion gear bearing 80. The outer end 74 of the pinion gear 20 includes a yoke attachment interface that supports the driveline yoke 16. The outer pinion gear bearing 80 is directly sandwiched between the second inner flange 88 and an end face of the driveline yoke 16. The outer flange 84 is axially spaced from the second inner flange 88 in a direction toward the outer end 74 of the pinion gear 20. The outer flange 84 includes the splined surface 62 that engages the splined lock member 44 to lock the pinion cage 40 to the carrier shell 42. The position of the outer flange 84 as shown in FIG. 4 is just one example position. The position of the outer flange 84 can be varied to locate the splined surface 62 at any desired location.

As shown in FIG. 3B, the pinion cage 40 includes a plurality of oil passages 90 spaced circumferentially apart from each other about the axis A to direct lubricating fluid to the pinion gear bearings 78, 80. A first outlet port 92 extends from the passages 90 to lubricate the outer pinion gear bearing 80. A second outlet port 94 is formed between the first 82 and second 88 inner flanges to lubricate the inner pinion gear bearing 78. A seal assembly 96 (FIG. 4) is positioned within the pinion cage 40 outboard of the outer pinion gear bearing 80 to provide a sealed interface between the pinion cage 40, outer pinion gear bearing 80, and yoke 16. A cover 98 is positioned over the seal assembly 96 for protection.

Figure 5:
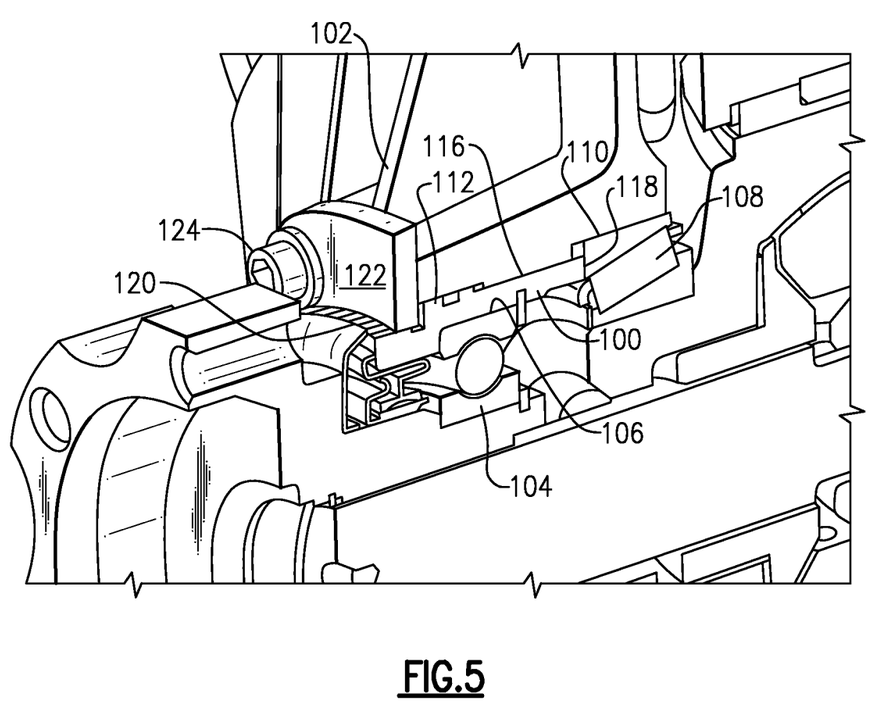
FIG. 5 is a cross-sectional view of a differential portion of a carrier assembly with an adjustment member incorporating the subject invention.

Another example of a threaded adjustment member is shown in FIG. 5. This adjustment member is similar to that shown in FIGS. 2-4 but is used to adjust bearing position within the differential 24. In the example of FIG. 5, the adjustment member comprises a cylindrical body 100 that is threaded to a differential case 102 to adjust differential bearing preload. An output shaft bearing 104 directly engages a pilot inner surface 106 of the body 100 and a differential bearing 108 directly engages an inner surface 110 of the differential case 102. A first 112 pilot surface is formed on the outer surface of the body 100 with a threaded surface 116 being formed on the outer surface at a position axially inboard of the first pilot surface 112. An end face 118 of the cylindrical body 100 directly abuts against the differential bearing 108 such that as the cylindrical body 100 is rotatable via the threaded surface 116 the differential bearing preload can be adjusted to a desired setting. In other words, the threaded adjustment member is rotated to "push" the bearing 108 and differential into the proper gear contact position. As the inner baring 108 has a pilot inner surface within the differential case 102, only the outer shaft bearing 104 requires a pilot surface 112 to be part of the threaded adjustment member.

The cylindrical body 100 includes a splined surface 120 and splined lock member 122 that operate in a manner similar to that described above with regard to FIGS. 2-4. Once the bearing preload has been adjusted to the desired setting, the lock member 122 is slid into splined engagement with the splined surface 120 and is attached to the differential case 102 with fasteners 124.

In the examples set forth above, the pilot surfaces on either side of the threaded surface provide a very close fit and the threaded attachment allows for infinite variation in preload setting or in contact setting for gears. The only limit to the variation is the locking feature. To maximize the variations for heavy-duty military vehicle applications, the number of splines for the outer splined surface of the adjustment member can be set to 180 spline teeth, for example; however, the number of splines can be varied for other types of axle configurations and vehicle applications as needed. The threaded adjustment member works well for military applications were vehicle life expectation is comparatively low. Higher mileage applications may experience wear due to the close fitting surfaces at the pilots.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A carrier assembly comprising:
   a housing;
   a hollow cylindrical body having an inner circumferential surface and an outer circumferential surface directly radially opposing an entirety of said inner circumferential surface, said outer circumferential surface having a threaded attachment surface to threadably attach to said housing;
   at least one bearing directly engaging said inner circumferential surface;
   a first pilot surface formed on said outer circumferential surface and positioned on one side of said threaded attachment surface;
   a second pilot surface formed on said outer circumferential surface and positioned on an opposite side of said threaded attachment surface, and wherein said cylindrical body is selectively adjustable via said threaded attachment surface to provide a desired carrier characteristic;
   a splined surface formed within said outer circumferential surface of said cylindrical body; and
   a splined lock member engaging said splined surface once said desired carrier characteristic is achieved to lock said cylindrical body to said housing.

2. The carrier assembly according to claim 1 wherein said splined lock member comprises an arcuate body with a splined inner circumferential surface that directly engages said splined surface of said cylindrical body.

3. A carrier assembly comprising:
   a housing;
   a hollow cylindrical body having an inner circumferential surface and an outer circumferential surface directly radially opposing said inner circumferential surface, said outer circumferential surface having a threaded attachment surface to threadably attach to said housing;
   at least one bearing directly engaging said inner circumferential surface;
   a first pilot surface formed on said outer circumferential surface and positioned on one side of said threaded attachment surface;
   a second pilot surface formed on said outer circumferential surface and positioned on an opposite side of said threaded attachment surface, and wherein said cylindrical body is selectively adjustable via said threaded attachment surface to provide a desired carrier characteristic;
   a splined surface formed within said outer circumferential surface of said cylindrical body; and
   a splined lock member directly attached to said housing with at least one fastener and comprising an arcuate body with a splined inner circumferential surface, said splined lock member directly engaging said splined surface, once said desired carrier characteristic is achieved to lock said cylindrical body to said housing.

4. The carrier assembly according to claim 1 wherein said housing comprises a differential case, said desired carrier characteristic comprises a differential bearing preload, and said at least one bearing comprises an output shaft bearing, and wherein said second pilot surface is inside of said differential case, and including a differential bearing engaging said second pilot surface wherein an end face of said cylindrical body directly abuts against said differential bearing such that said cylindrical body is rotatable via said threaded attachment surface to adjust said differential bearing preload.

5. The carrier assembly according to claim 1 wherein said housing comprises a carrier shell and said cylindrical body comprises a pinion cage that is attached to said carrier shell, and including
   a ring gear positioned within said carrier shell, said ring gear having a plurality of ring gear teeth;
   a pinion gear having an inner end and an outer end, said inner end including a plurality of pinion gear teeth in meshing engagement with said plurality of ring gear teeth,
   wherein said at least one bearing comprises a first pinion gear bearing positioned adjacent said inner end and a second pinion gear bearing axially spaced from said first pinion gear bearing in a direction toward said outer end, said first and second pinion gear bearings rotatably supporting said pinion gear for rotation relative to said pinion cage,
   wherein said second pilot surface is formed on said outer circumferential surface of said cylindrical body such that said threaded attachment surface is positioned axially between said first and second pilot surfaces, and
   wherein said desired carrier characteristic comprises a gear contact pattern between said pinion gear and said ring gear.

6. The carrier assembly according to claim 5 wherein said pinion cage includes an inner flange that directly abuts against said first pinion gear bearing and an outer flange that directly faces an end face of said carrier shell such that no shims are required to set said gear contact pattern.

7. The carrier assembly according to claim 5 wherein at least a portion of said first pilot surface overlaps said first pinion gear bearing and at least a portion of said second pilot surface overlaps said second pinion gear bearing.

8. A carrier assembly comprising:
- a carrier shell;
- a ring gear positioned within said carrier shell, said ring gear having a plurality of ring gear teeth;
- a pinion gear having a plurality of pinion gear teeth in meshing engagement with said plurality of ring gear teeth;
- a pinion cage mounted to said carrier shell and supporting said pinion gear for rotation with respect to said pinion cage, said pinion cage having a radially outward facing first pilot surface to directly face a first inner surface portion of said carrier shell and a radially outward facing second pilot surface to directly face a second inner surface portion of said carrier shell that is axially spaced from said first inner surface portion, and wherein said pinion cage includes a threaded surface that engages a mating threaded surface on said carrier shell that is positioned between said first and said second inner surface portions, and wherein said pinion cage is selectively adjustable via said threaded surface to provide a desired gear contact pattern between said pinion gear and said ring gear; and
- a splined surface formed within an outer circumferential surface of said pinion cage, and a splined lock member engaging said splined surface once said desired gear contact pattern is achieved to lock said pinion cage to said carrier shell.

9. The carrier assembly according to claim 8 wherein said pinion gear includes an inner end and an outer end, said inner end including an enlarged gear head portion that forms said plurality of pinion gear teeth, and including a first pinion gear bearing positioned adjacent said inner end and a second pinion gear bearing axially spaced from said first pinion gear bearing in a direction toward said outer end, said first and second pinion gear bearings rotatably supporting said pinion gear for rotation relative to said pinion cage.

10. The carrier assembly according to claim 9 wherein said pinion cage includes an inner flange that directly abuts against said first pinion gear bearing and an outer flange that directly faces an end face of said carrier shell such that no shims are required to set said desired gear contact pattern.

11. The carrier assembly according to claim 9 wherein said pinion cage includes a first inner flange that directly abuts against said first pinion gear bearing such that said first pinion gear bearing is sandwiched directly between said first inner flange and said enlarged gear head portion, and including a second inner flange that directly abuts against said second pinion gear bearing.

12. The carrier assembly according to claim 11 wherein said outer end of said pinion gear includes a yoke attachment interface that supports a driveline yoke, said second pinion gear bearing being directly sandwiched between said second inner flange and an end face of said driveline yoke.

13. The carrier assembly according to claim 11 wherein said pinion cage includes an outer flange axially spaced from said second inner flange in a direction toward said outer end of said pinion gear, said outer flange include a splined surface that engages a splined lock member to lock said pinion cage to said carrier shell.

14. The carrier assembly according to claim 8 including at least one pinion gear bearing that supports said pinion gear for rotation relative to said pinion cage about an axis, and wherein said pinion cage includes a plurality of oil passages spaced circumferentially apart from each other about said axis to direct lubricating fluid to said at least one pinion gear bearing.

15. A method of adjusting gear contact between a pinion gear and a ring gear positioned within a carrier shell, the method comprising the steps of:
(a) providing a pinion cage mounted to the carrier shell and supporting the pinion gear for rotation with respect to the pinion cage, the pinion cage having an outer threaded surface portion, a radially outward facing first pilot surface positioned on one side of the outer threaded surface portion, and a radially outward facing second pilot surface positioned on an opposite side of the outer threaded surface portion;
(b) fitting the first and second pilot surface portions within the carrier shell while threadably attaching the pinion cage to a mating threaded surface on the carrier shell;
(c) rotating the pinion cage relative to the carrier shell via the threaded attachment to adjust a gear contact position of the pinion gear relative to the ring gear to achieve a desired gear contact pattern; and
(d) engaging a splined lock member with a splined outer surface formed on the pinion cage, to lock the pinion cage to the carrier shell.

\* \* \* \* \*

UNITED STATES PATENT AND TRADEMARK OFFICE
CERTIFICATE OF CORRECTION

PATENT NO. : 9,074,677 B2  
APPLICATION NO. : 13/046943  
DATED : July 7, 2015  
INVENTOR(S) : Robert J. Martin, III et al.

Page 1 of 1

It is certified that error appears in the above-identified patent and that said Letters Patent is hereby corrected as shown below:

In the Claims

Column 5, Line 45, Claim 1:

After "circumferential surface"  
Insert -- , said outer circumferential surface --.

Column 5, Line 47, Claim 1:

After "inner circumferential surface"  
Insert -- and said inner circumferential surface directly radially opposing an entirety of said outer circumferential surface --.

Column 7, Line 12, Claim 8:

After "said carrier shell and"  
Insert -- directly --.

Signed and Sealed this  
Twenty-second Day of December, 2015

Michelle K. Lee  
*Director of the United States Patent and Trademark Office*